United States Patent [19]

Washington et al.

[11] Patent Number: 5,401,119

[45] Date of Patent: Mar. 28, 1995

[54] PROCESS AND APPARATUS FOR THE DISPOSAL OF WASTE MATERIALS

[75] Inventors: Bobby H. Washington, Waverly; Eddie C. Burt, Auburn, both of Ala.

[73] Assignee: The United States of America as represented by the Secretary of Agriculture, Washington, D.C.

[21] Appl. No.: 140,801

[22] Filed: Oct. 21, 1993

[51] Int. Cl.[6] .......................... E02F 5/12; E02D 3/10
[52] U.S. Cl. ................................. 405/129; 405/128; 405/179
[58] Field of Search ........ 405/129, 128, 258, 174–182; 111/109

[56] References Cited

U.S. PATENT DOCUMENTS

| | | |
|---|---|---|
| 1,847,327 | 3/1932 | Bateman . |
| 1,893,512 | 1/1933 | Zuckerman . |
| 2,936,838 | 5/1960 | Bonomo et al. .................. 172/28 |
| 2,949,871 | 8/1960 | Finn .................................. 111/1 |
| 3,170,421 | 2/1965 | Norris et al. ...................... 111/1 |
| 3,446,026 | 5/1969 | Fiske ................................. 405/129 |
| 3,511,056 | 5/1970 | Jones et al. ...................... 405/129 |
| 3,583,168 | 6/1971 | Horton ............................ 405/179 |
| 3,625,374 | 12/1971 | Hemphill ......................... 214/6 |
| 3,742,877 | 7/1973 | Coffee ............................. 111/6 |
| 3,865,056 | 2/1975 | Danford ...................... 405/129 X |
| 3,866,552 | 2/1975 | Leidig ............................. 111/85 |
| 3,986,463 | 10/1976 | Houston et al. ................. 111/1 |
| 4,067,504 | 1/1978 | Teates ............................. 241/101.7 |
| 4,219,966 | 9/1980 | McCalister ....................... 47/9 |
| 4,248,548 | 2/1981 | Danford .......................... 405/129 |
| 4,315,547 | 2/1982 | Rau et al. ........................ 172/1 |
| 4,981,396 | 1/1991 | Albertson et al. ............ 405/179 X |

OTHER PUBLICATIONS

Edwards, J. H., et al., "Effects of Deep Placement of Nutrients, Broiler Litter, and Newsprint on Cotton Yield and Rooting Depth", 1992 Beltwide Cotton Conference, Nashville, Tenn., Jan. 6–10, 1992, pp. 1143–1146.

Edwards, J. H., "Recycling Newsprint in Agriculture," Reprinted from Jul. 1992, *Biocycle*.

Spain, James M., "Something New in Subsoiling", Reprinted from *Agronomy Journal*, vol. 48, pp. 192–193, 1956.

Curley, R. G., et al., "Vertical Mulching One Possible Solution to Soil Compaction Problems", University of California, Agricultural Extension Service, (also reproduced by *Western Grower & Shipper*, Nov., 1958).

Saxton, K. E., "Slot Mulch Tillage for Water Management and Reduced Erosion," *Crop Production With Conservation in the 80's*, Proceedings of the American Society of Agricultural Engineers Conference on Crop Production with Conservation in the 80's, Dec. 1980, pp. 42–49.

Clark, D. E., et al., "Vertical and Horizontal Mulch on Haldimand Clay", *Transactions of the ASAE, pp. 592–593, 1965.*

*Primary Examiner*—Dennis L. Taylor
*Attorney, Agent, or Firm*—M. Howard Silverstein; Randall E. Deck; John D. Fado

[57] ABSTRACT

An apparatus and method for the disposal of biodegradable solid waste material such as as cellulosic material and paper. The apparatus includes a trench cutter for both cutting a trench in the soil and maintaining the trench open to facilitate subsequent deposit of both waste material and soil therein. Waste material to be disposed of is held in a receptacle, and is delivered into the open trench through a dispenser positioned rearward of the trench cutter. A backfiller is also provided on the apparatus for directing borrow soil removed by the trench cutter back into the trench together with the waste material. A mixer is provided rearward of the dispenser and backfiller for mixing the backfilled soil with the waste material within the trench, increasing contact of the waste material with soil microorganisms and moisture and thereby speeding decomposition.

14 Claims, 3 Drawing Sheets

PROCESS AND APPARATUS FOR THE DISPOSAL OF WASTE MATERIALS

BACKGROUND OF THE INVENTION

1. Field of the Invention

This invention relates to a process and apparatus for disposal of biodegradable waste material by depositing the material in a trench cut into the soil, and backfilling the trench with the borrow soil while mixing with the deposited material. The treatment provides the dual advantage of disposing of waste material and improving the quality of the soil.

Disposal of vast amounts of solid biodegradable waste such as newspaper and other cellulosic materials poses a significant environmental problem. For example, although some paper products may be recycled, only a small fraction of generated paper is handled in this manner. Most paper products continue to be disposed of in landfills, consuming a large proportion of the available landfill volume and hence contributing to their premature exhaustion.

2. Description of the Prior Art

Soil compaction and crusting, and the resultant increase in runoff, are well recognized problems in agriculture, which arise from conventional tilling methods of farming. One solution that has been proposed to increase water infiltration into these soil surfaces has been vertical mulching. It has been reported that runoff may be reduced using this process which includes the steps of cutting a trench in the soil, and filling or stuffing the trench with chopped crop residues such as hay and straw to keep the trench open over an extended period of time. See Spain and McCune (Agronomy Journal, 48:192–193, 1956), Curley et al. (Vertical Mulching, University of California Agricultural Extension Service publication, 8 pages), Clark and Hore (Transactions of the ASAE, 1965, pages 592–593), and Saxton (Proceedings of the American Society of Agricultural Engineers Conference on Crop Production With Conservation in the 80's, December, 1980, pages 42–49). Devices for vertical mulching have also been described, which include a subsoil chisel for cutting the trench, and a mechanism for filling the trench with the crop residues. See Finn (U.S. Pat. No. 2,949,871), Bonomo et al. (U.S. Pat. No. 2,936,838), and Curley et al. (ibid). However, in these vertical mulching processes, filling the trench with the crop residues is essential in order to maintain in an open condition and prevent it from closing.

SUMMARY OF THE INVENTION

We have now invented an apparatus and method for the disposal of biodegradable solid waste material such as as cellulosic material and paper. The apparatus includes a trench cutter for both cutting a trench in the soil and maintaining the trench open to facilitate subsequent deposit of both waste material and soil therein. Waste material to be disposed of is held in a receptacle, and is delivered into the open trench through a dispenser positioned rearward of the trench cutter. A backfiller is also provided on the apparatus for directing borrow soil removed by the trench cutter back into the trench together with the waste material. A mixer is provided rearward of the dispenser and backfiller for mixing the backfilled soil with the waste material within the trench, increasing contact of the waste material with soil microorganisms and moisture and thereby speeding decomposition.

In accordance with this discovery, it is a primary object to provide a method and apparatus for the disposal of biodegradable solid waste material, as an alternative to landfill disposal.

It is a further object to provide a method and apparatus for the disposal of cellulosic material such as paper.

Yet another object is to provide an apparatus for the disposal of biodegradable solid waste material onto agricultural land to improve the quality of the soil for subsequent crop production.

Other objects and advantages of the invention will become apparent from the ensuing description.

DETAILED DESCRIPTION OF THE INVENTION

The apparatus of this invention was designed for the disposal of a variety of biodegradable solid waste materials by forming a trench, dispensing the waste material in the trench while backfilling the same with the borrow soil, and mixing the material and soil deposited in the trench. Without being limited thereto, the apparatus is especially suited to the disposal of organic matter such as chicken litter, animal or plant waste, fly ash, and particularly cellulosic material, including paper, cardboard and insulation. When disposing of paper or cardboard sheets, it is preferred to shred or grind the material, such as in a hammer mill, to increase subsequent contact with the soil and enhance decomposition. While the waste may be disposed of in urban or rural locations, in accordance with a preferred embodiment the waste is disposed of on agricultural land and fields. The addition of organic matter to the soil as described herein provides the added benefit of improving the soil physical and chemical qualities for supporting plant growth.

Figure 1:
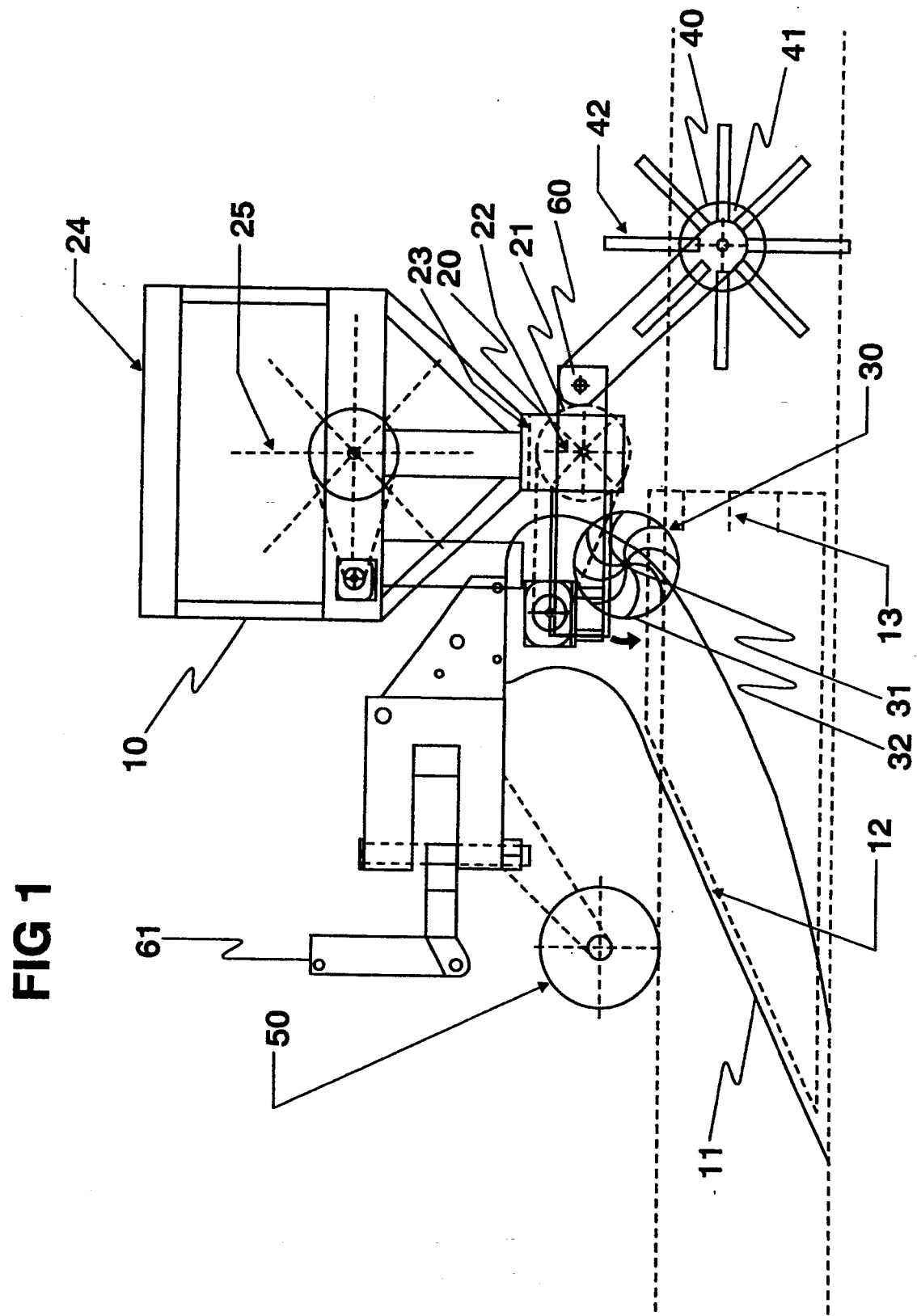
FIG. 1 is a side view of one embodiment of the invention.

Referring now to FIG. 1, the apparatus 10 includes a trench cutter or trencher 11. Trench cutter 11 includes a leading edge 12 effective to cut a trench when lowered into the ground and drawn therethrough, and a pair of approximately vertical plates 13 on opposite sides of and extending behind the leading edge 12. Plates 13 are spaced apart so as to form an enclosure behind the leading edge 12, for holding the trench open. Keeping the trench open is essential to allow the deposit and mixing of the waste material and backfill soil therein. The shape of the trench cutter is not critical, and a variety of forms of both the leading edge and plates may be employed. In accordance with one preferred embodiment shown in FIG. 1, the trench cutter is a modified slip plow, having a simple inclined plane or flat surface as the leading edge 12 for cutting a wide trench, with a pair of spaced apart vertical steel plates 13 mounted on opposite sides of and extending behind the leading edge. In the alternative, the surface of the leading edge 12 may be blade-shaped or pointed to facilitate cutting, and the leading edge 12 may be inclined as shown, curved, or vertical. Plates 13 may also be curved or planar, and the spacing between the plates 13 may be tapered in the vertical and/or in the horizontal direction (e.g. toward the leading edge 12). When a vertical leading edge 12 is employed, an optional chisel may be advantageously mounted to the bottom thereof. Without being limited thereto, suitable alternative trench cutters having chisels are described, for example, by Finn (U.S. Pat. No. 2,949,871) and Bonomo et al. (U.S. Pat. No. 2,936,838), the contents of each of which are incorporated by reference herein. Additionally, covering the outer surfaces of the leading edge 12 and/or plates 13 with plastic increases the usable life of the trench cutter and reduces the resistance to passage through the ground.

Following the cutting of the trench, waste material is deposited into the open trench through a dispenser 20 positioned behind the trench cutter 11. The dispenser 20 preferably includes one or more metering mechanisms, shown at 21 and 23 in FIG. 1, for variably controlling the rate of waste material delivery into the trench. Dispenser 20 communicates with a receptacle 24, such as a hopper or bin, holding the waste material prior to deposit in the trench. A variety of suitable dispensers 20 and metering mechanisms may be utilized in this apparatus. Without being limited thereto, in the preferred embodiment, dispenser 20 is constructed as a chute or conduit in direct communication with hopper 24, allowing for gravity flow of material from the hopper into the trench. Metering mechanism 21 is constructed as a variable speed paddle wheel having a rotating axle with a plurality of rigid radial fins or paddles 22 extending across the opening of dispenser chute 20. Improved flow may be obtained by providing small slots in the outer edge of fins 22. Metering mechanism 23 is a baffle plate which may have fixed or adjustable openings. The rate of waste material flow may be controlled by adjusting the speed of rotation of mechanism 21 and/or the size of the openings of mechanism 23. Agitator 25 may be provided within the hopper to prevent the waste material from bridging.

The skilled practitioner will recognize that other dispensers and/or receptacles may be used. For example, in accordance with one alternative embodiment, a large capacity receptacle may be carried on a trailer with mechanical feed of waste material to the hopper 24, or directly to dispenser 20, via a conveyor belt or blower. In another alternative embodiment, the dispenser may itself be a conveyor adapted to receive and convey material from a hopper to a trench, such as described by Finn (U.S. Pat. No. 2,949,871), with the rate of material deposit controlled by altering the speed of the conveyor. Other metering mechanisms may be used as well. In accordance with another alternative embodiment, the metering mechanism may be a simple swinging gate positioned across dispenser chute 20, with control of flow achieved by changing the position of the gate.

Figure 2:
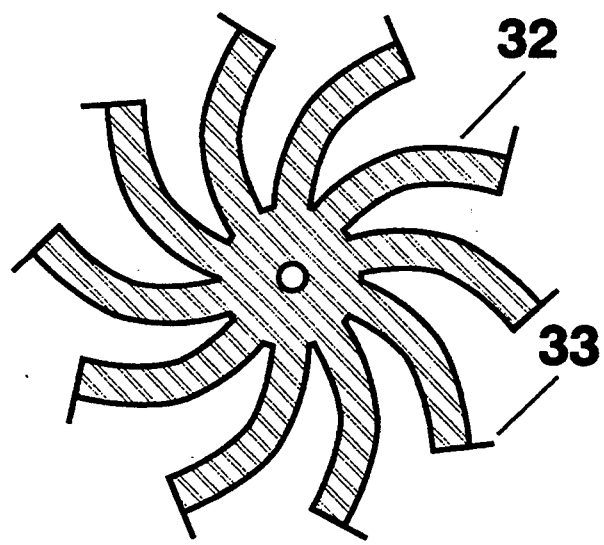
FIG. 2 (A) and (B) are side and top views, respectively, of the spiders for backfilling in accordance with the embodiment of FIG. 1.
Figure 2:
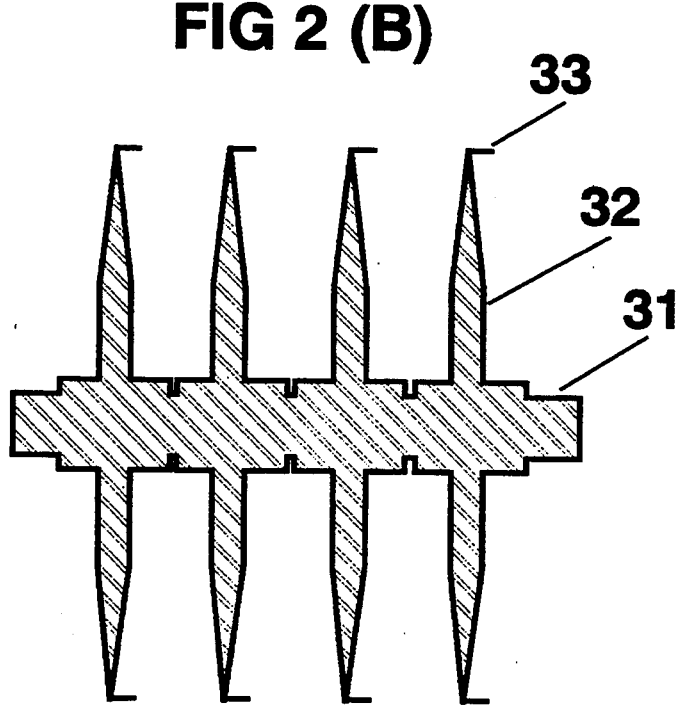

Concurrent with the deposition of waste material into the trench, borrow soil removed by the trench cutter is replaced into the trench by backfiller 30, where it is combined with the deposited waste material to fill the trench. The construction of the backfiller 30 is not critical, and a variety of suitable devices may be used. In accordance with one preferred embodiment, backfiller 30 includes one or more spiders positioned on each side of trench cutter 11. Shown in more detail in FIGS. 2 (A) and (B), each spider has a rapidly rotating axle 31 having a plurality arcuate projections or tines 32 rotating in the direction of travel of the apparatus 10, and oriented with the plane of the tines being transverse to the line of the trench so as to engage the pile of soil removed by the trench cutter 11 and direct the same into the trench. To aid in moving the soil, small projecting feet or lips 33 are preferably attached to the outer edges of tines 32, approximately at a right angle thereto. Although the spiders may be positioned behind the dispenser 20, placement behind the leading edge 12, but ahead of the disperser 20 is preferred. This placement provides the added advantage of enhanced mixing of the soil with waste material by directing the soil into the path of the falling waste. In accordance with an alternate preferred embodiment shown in FIG. 3, the backfiller 30 may include a pair of horizontal graders or blades 34, positioned adjacent to or behind the dispenser 20, with one on each side of the trench cutter 11, and forming an acute angle with the line of the trench to deflect or funnel soil lying on the surface into the trench as the apparatus traverses a field. Still other suitable backfillers include, but are not limited to, deflecting discs as are conventional in the art.

Once deposited into the trench waste material and backfill soil are intermixed by action of sub-soil mixer 40. Mixer 40 is positioned below and behind dispenser 20 and backfiller 30, and is colinear with trench cutter 11, so as to pass through the trench. Without being limited thereto, in one preferred embodiment the mixer 40 may be a mixing wheel having a freely rotating axle 41 with a plurality of radiating projections or spikes 42. As the apparatus traverses the ground and spikes 42 rotate, they engage the waste material and soil within the trench, creating a churning action. In the alternate preferred embodiment of FIG. 3, the mixer may be a powered rotating wheel 43 having a plurality of teeth 44 mounted on the outer edge thereof. The skilled practitioner will recognize that a variety of other mixers may be used, such as a rotating auger pulled through the trench.

Optionally, a mower or cutting coulters 50 conventional in the art may be included on the apparatus when treating ground covered with heavy vegetation or other trash.

In the preferred embodiment the apparatus is constructed as a field-going machine having frame 60 for carrying the above-mentioned trench cutter 11, dispenser 20, backfiller 30, mixer 40 and optionally receptacle 24, and also including a means for providing power to drive the components. As shown in FIG. 1, the frame 60 may include a bracket 61 for mounting the apparatus to a suitable vehicle from which the apparatus is suspended. Movement of the apparatus between a raised position for transportation and storage and a lowered position for engaging the ground may be accomplished by a conventional lifting device (not shown) on the vehicle. Alternatively, the apparatus may include a ground traversing carriage to which the frame is attached, and which may be connected to any suitable vehicle, such as a tractor, with a hitch. In this embodiment, the carriage may include a self-contained lifting mechanism for raising and lowering the apparatus. Without being limited thereto, suitable lifting mechanisms include pneumatic or hydraulic cylinders as are conventional in the art. In either of these embodiments, power to operate the components may include a suitable power take-off mechanism for connection to the tractor or vehicle as is conventional in the art, or a self-contained power source such as a diesel or gasoline engine, or electric engines drawing energy from the vehicle. The practitioner skilled in the art will recognize that the power supply should include suitable drive belts, gears, or other conventional drive mechanisms for connection between the power source and the moving components.

Figure 3:
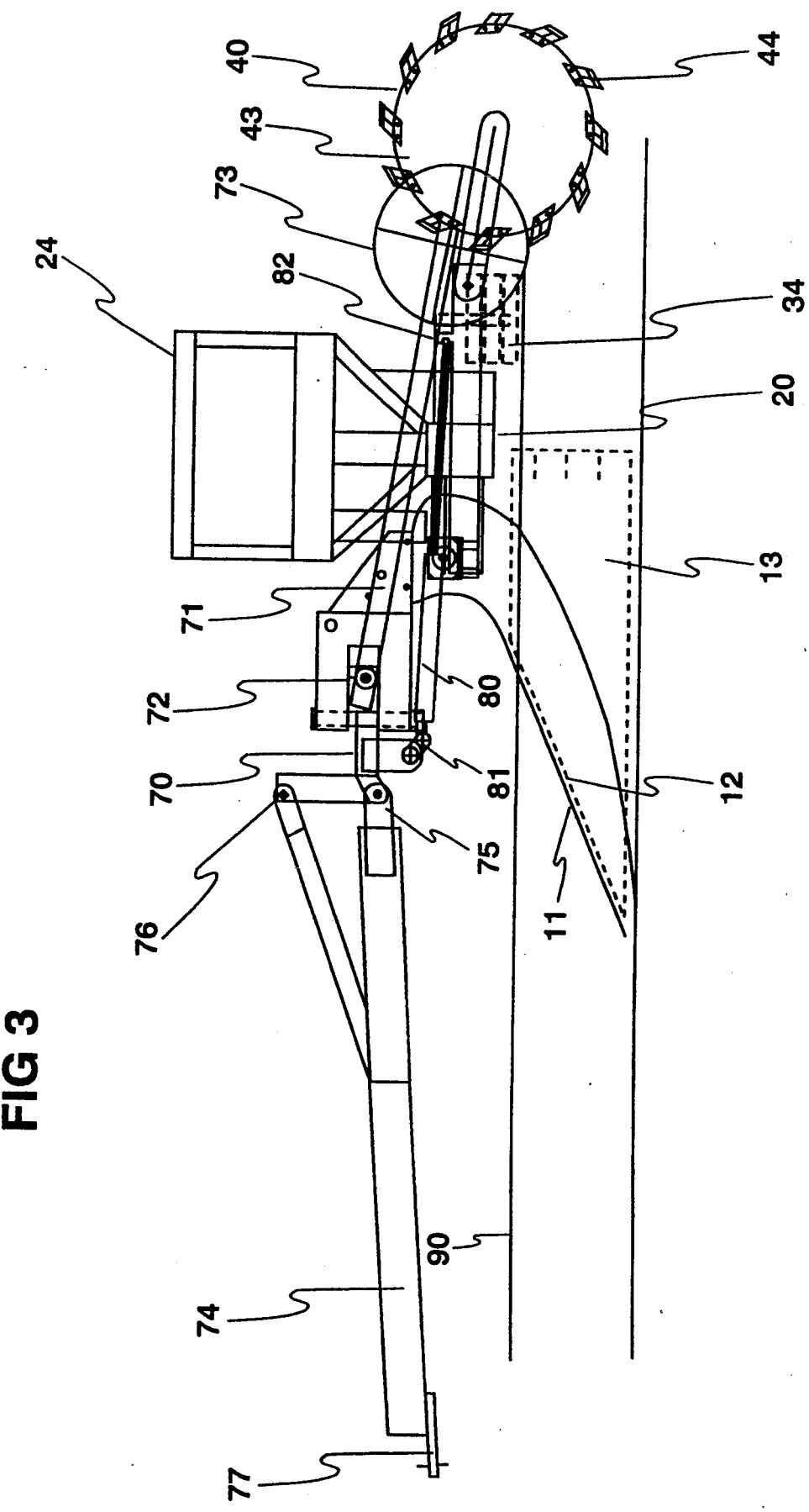
FIG. 3 is a side view of a second embodiment of the invention.

A preferred embodiment of an apparatus incorporating a ground traversing carriage with a self-contained lifting mechanism is shown in FIG. 3. As shown therein, carriage 70 includes a first support member 71 pivotally attached at one end to frame 60 at bracket 72, and having support wheels 73 at its opposite end. Carriage 70 further includes a second support member 74 pivotally connected at one end to frame 60 at brackets 75 and 76, and having hitch 77 at its opposite end for attachment to a tractor. Controlled raising and lowering of the apparatus is accomplished by operation of hydraulic cylinders 80, pivotally connected at opposite ends to frame 60 at bracket 81, and to first carriage member 71 at bracket 82. Contraction of cylinders 80 effects a scissor-like movement of the carriage members 71 and 72 about brackets 72, and 75 and 76, drawing wheels 73 toward hitch 77, and consequently raising trench cutter 11 and mixer 40 above soil surface 90. Conversely, lowering of the trench cutter and mixer 40 into the soil is effected by expansion of the cylinders 80. Power for operation is preferably provided through use of tractor hydraulics together with a power take-off shaft driving a hydraulic pump (not shown) as is conventional in the art.

While the apparatus of this invention may be used singly, that is, with a single apparatus driven or pulled by a given vehicle, it is understood that a plurality of the devices may be combined for operation with a given vehicle to increase the rate of waste material disposal.

The sizes of the components of the apparatus, and most notably trench cutter 11, are not critical and may be readily determined by the skilled practitioner. However, it is apparent that the size of the trench cutter, and hence the size of the trench, may limit the desired rate of waste material application. Without being limited thereto, for practical purposes, the trench cutter is preferably adapted to cut a trench about 24 inches deep and about 6 to 10 inches wide. Trenches of a smaller size may limit the volume of waste material that may be deposited per linear foot, while trenches cut substantially deeper than approximately 24 inches may not give optimal plant response when those fields are later used to support crop growth.

The amount of waste material that can be deposited in the soil with this invention will obviously vary with a plurality of factors including the composition of the particular waste material, its rate of decomposition, the soil type, moisture and climate. In agricultural land near Auburn, Ala., up to about 12 to 20 tons of ground newsprint (ground with a hammer mill with a 0.50 in. screen yielding paper particles about 0.25 in. in size) may be disposed of per acre per growing season, with a rate of deposit between about 1 to 4 pounds of cellulosic material per linear foot. In addition, when disposing of cellulosic waste, decomposition may be greatly enhanced by addition of Nitrogen. For example, addition of 85 lb. chicken litter per 125 lb. of cellulosic material (deposited per 60 linear feet) accelerates the rate of decomposition of the cellulosic waste and improves the nutrient content of the soil. Addition of water to cellulosic waste also alters the handling qualities of material, allowing greater flexibility of disposal rates through the dispenser.

It is understood that the foregoing detailed description is given merely by way of illustration and that modifications and variations may be made therein without departing from the spirit and scope of the invention.

We claim:

1. An apparatus for disposal of waste material comprising:
   (a) a trench cutter having a leading edge effective for cutting a trench when lowered into the ground and drawn therethrough, and a pair of approximately vertical plates on opposite sides of said leading edge and extending behind said leading edge, said plates being spaced apart to form an enclosure behind said leading edge;
   (b) a dispenser positioned rearward of said plates effective for delivering waste material into said trench;
   (c) a receptacle for holding said waste material communicating with said dispenser;
   (d) a backfiller effective for delivering soil removed from said trench by said trench cutter into said trench; and
   (e) a mixer positioned rearward of said disperser and said backfiller for mixing backfilled soil with said waste.

2. The apparatus of claim 1 wherein said leading edge is an inclined plane.

3. The apparatus of claim 1 wherein said dispenser further comprises at least one metering mechanism effective for controlling the rate of waste material delivery into said trench.

4. The apparatus of claim 3 wherein said metering mechanism comprises a paddle wheel having a plurality of radial fins.

5. The apparatus of claim 4 wherein the outer edge of said fins have slots out therein.

6. The apparatus of claim 3 wherein said metering mechanism comprises an apertured baffle plate.

7. The apparatus of claim 1 wherein said receptacle comprises a hopper in direct communication with sid dispenser.

8. The apparatus of claim 7 wherein said hopper further comprises an agitator therein.

9. The apparatus of claim 1 wherein said backfiller comprises at least one spider positioned on each side of said trench cutter, each said spider having a rotating axle with a plurality of outwardly extending arcuate projections thereon.

10. The apparatus of claim 1 wherein said backfiller comprises a pair of horizontal graders, one of said graders being positioned on each side of said trench cutter.

11. The apparatus of claim 1 wherein said mixer comprises a spiked wheel.

12. The apparatus of claim 1 wherein said mixer comprises a power driven rotating wheel having a plurality of teeth on the outer edge thereof.

13. The apparatus of claim 1 wherein said leading edge or said plates or both, of said trench cutter are covered with plastic.

14. A method for dispensing of waste material comprising:
   (a) providing an apparatus comprising:
      (1) a trench cutter having a leading edge effective for cutting a trench when lowered into the ground and drawn therethrough, and a pair of approximately vertical plates on opposite sides of said leading edge and extending behind said leading edge, said plates being spaced apart to form an enclosure behind said leading edge;

(2) a dispenser positioned rearward of said plates effective for delivering waste material into said trench;

(3) a receptacle for holding said waste material communicating with said dispenser;

(4) a backfiller effective for delivering soil removed from said trench by said trench cutter into said trench; and (5) a mixer positioned rearward of said dispenser and said backfiller for mixing backfilled soil with said waste;

(b) cutting a trench in the ground by drawing said trench cutter therethrough;

(c) dispensing said waste material into said trench from said receptacle via said dispenser;

(d) backfilling soil removed from said trench by said trench cutter simultaneously with said dispensing of said waste material;

(e) mixing said waste material and said soil backfilled into said trench.

* * * * *